(12) United States Patent
Evans

(10) Patent No.: US 8,393,462 B2
(45) Date of Patent: Mar. 12, 2013

(54) SLOPE PLATE CARROUSEL CARRIAGE FRAME

(75) Inventor: Brian Charles Evans, Marshfield, MA (US)

(73) Assignee: Globe Composite Solutions, Ltd., Dallas, TX (US)

( * ) Notice: Subject to any disclaimer, the term of this patent is extended or adjusted under 35 U.S.C. 154(b) by 88 days.

(21) Appl. No.: 13/108,527

(22) Filed: May 16, 2011

(65) Prior Publication Data

US 2011/0278137 A1    Nov. 17, 2011

Related U.S. Application Data

(60) Provisional application No. 61/395,520, filed on May 17, 2010.

(51) Int. Cl.
*B65G 17/06* (2006.01)

(52) U.S. Cl. .......................... 198/831; 198/853

(58) Field of Classification Search .............. 198/831, 198/850, 851, 853, 778
See application file for complete search history.

(56) References Cited

U.S. PATENT DOCUMENTS

| | | | | |
|---|---|---|---|---|
| 3,180,483 A | * | 4/1965 | Johnston et al. | 198/803.16 |
| 3,361,249 A | * | 1/1968 | Cadman et al. | 198/607 |
| 3,410,390 A | * | 11/1968 | Petersen | 198/822 |
| 3,598,230 A | * | 8/1971 | Riley | 198/607 |
| 3,718,249 A | * | 2/1973 | Hess | 198/822 |
| 3,777,877 A | * | 12/1973 | Piper | 198/833 |
| 3,854,574 A | * | 12/1974 | Theijsmeijer et al. | 198/834 |
| 3,881,592 A | * | 5/1975 | Stimpson | 198/833 |
| 4,194,616 A | * | 3/1980 | Barthelemy et al. | 198/778 |
| 4,650,066 A | * | 3/1987 | Bradbury | 198/832 |
| 4,883,160 A | * | 11/1989 | Sansevero et al. | 198/328 |
| 4,884,673 A | * | 12/1989 | Rivera | 198/328 |
| 4,930,622 A | * | 6/1990 | Sansevero | 198/328 |
| 4,953,685 A | * | 9/1990 | Johnson | 198/328 |
| 5,165,526 A | * | 11/1992 | Conklin, Jr. | 198/804 |
| 5,263,571 A | * | 11/1993 | Crandall et al. | 198/502.1 |
| 5,311,981 A | * | 5/1994 | Crandall et al. | 198/502.1 |
| 5,330,044 A | * | 7/1994 | Conklin, Jr. | 198/502.1 |
| 5,394,978 A | * | 3/1995 | Majewski et al. | 198/833 |
| 5,427,227 A | * | 6/1995 | Crandall et al. | 198/502.1 |
| 6,186,314 B1 | * | 2/2001 | Conklin, Jr. | 198/502.1 |
| 6,279,732 B1 | | 8/2001 | Thompson | |
| 6,640,957 B2 | * | 11/2003 | Fargo et al. | 198/321 |
| 6,698,577 B1 | * | 3/2004 | Conklin et al. | 198/502.1 |
| 7,611,007 B2 | * | 11/2009 | Lim et al. | 198/853 |
| 7,621,392 B2 | * | 11/2009 | Langsdorf et al. | 198/832 |
| 2007/0029166 A1 | * | 2/2007 | Lim et al. | 198/370.04 |
| 2007/0254124 A1 | * | 11/2007 | Alberding | 428/36.3 |
| 2008/0296130 A1 | | 12/2008 | Langsdorf et al. | |
| 2009/0261210 A1 | * | 10/2009 | Moore et al. | 248/49 |

FOREIGN PATENT DOCUMENTS

WO    WO-2004009478 A1    1/2004

OTHER PUBLICATIONS

International Search Report and Written Opinion for PCT/US2011/036658 mailed Jan. 9, 2012 (9 pages).

* cited by examiner

*Primary Examiner* — Gene Crawford
*Assistant Examiner* — Keith R Campbell
(74) *Attorney, Agent, or Firm* — Gardere Wynne Sewell LLP; Andre M. Szuwalski

(57) ABSTRACT

The present disclosure is directed to a carriage frame that is used in a slope plate carriage carrousel system that may be found in airports for conveying luggage for passengers to claim. A slope plate carrousel carriage frame according to an embodiment of the present disclosure includes a slope plate support member. The slope plate support member is configured to support a slope plate of the carrousel system. A lower carriage is coupled to the slope plate support member. The carriage frame also includes at least one removable connecting link.

18 Claims, 3 Drawing Sheets

SLOPE PLATE CARROUSEL CARRIAGE FRAME

PRIORITY CLAIM

This application claims the benefit of U.S. Provisional Application for Patent No. 61/395,520, filed May 17, 2010, the disclosure of which is hereby incorporated by reference.

TECHNICAL FIELD

The present invention relates generally to slope plate luggage claim systems, and particularly to a multi-component carriage frame assembly used with slope plate luggage claim systems.

BACKGROUND

Slope plate carrousel luggage claim systems are commonly used in airports around the world. Traditionally, these systems are constructed using welded steel for the carriage frames. Each carriage frame is connected to an adjacent carriage frame to form the collective length of the driven frame of the luggage claim system. A stainless steel slope plate, down which luggage may slide, may be bolted to each of the steel carriage frames.

With use over time, certain parts of the carrousel carriage frame may wear and break down resulting in costly repair and/or replacement. Moreover, the entire system may be out of service for the duration of the repair process because, in most cases, the welded steel carriage frame must be removed from the system to facilitate repair.

It has been observed that the welded carrousel carriage frame is likely to fail at the connecting link, where one carriage frame is joined to the next. These connecting links wear like any chain over time, which may cause elongation of the joined carriage length and pitch problems engaging the overall system drive.

SUMMARY

The present disclosure is directed to a carriage frame that is used in a slope plate carriage carrousel system that may be found in airports for conveying luggage for passengers to claim. A slope plate carrousel carriage frame according to an embodiment of the present disclosure includes a slope plate support member. The slope plate support member is configured to support a slope plate of the carrousel system. A lower carriage is coupled to the slope plate support member. The carriage frame also includes at least one removable connecting link. The connecting link may be removable from the lower carriage and replaced with a new connecting link without requiring removal of the entire carriage frame. The connecting link is configured to connect to an adjacent connecting link of an adjacent lower carriage. A carriage frame according to embodiments of the present disclosure may be used and connected with other similar carriage frame assemblies and may also be connected to conventional one-piece steel construction carriage frames that already exist in most slope plate luggage carrousel systems. Some or all of the components of the disclosed system may be made with materials other than metal. For example, non-metallic composite materials may be used to form the lower carriage and the removable connecting links that connect thereto.

Technical advantages of embodiments of the present disclosure include removable connecting links that are separate components that make up a carriage frame assembly. In normal operation of the carrousel system, these connecting links may wear and ultimately fail under normal operational forces. When the connecting links wears or fails, it may easily and conveniently be removed and replaced with a new connecting link. In certain embodiments, this removal and replacement operation may be performed without removing the carriage frame assembly from the carrousel.

By replacing conventional one-piece welded steel construction carriage frames with the slope plate carriage frame assemblies of the present disclosure, significant weight reduction of the overall luggage carrousel system may be realized. For example, a luggage carrousel comprised of approximately 200 carriage frames may be constructed according to the teachings of the present disclosure with component parts fabricated from non-metallic composite material, as opposed to steel. Such composite material luggage carrousel system may be approximately 4,000 pounds lighter than a conventional welded steel luggage carrousel system. Moreover, if the steel slope plates are replaced with slope plates made of a non-metallic composite material, an additional 4,000 pounds of the overall system may be eliminated. Such substantial weight reduction results in much less energy consumed to operate the luggage carrousel system.

DETAILED DESCRIPTION OF THE DRAWINGS

Figure 1:
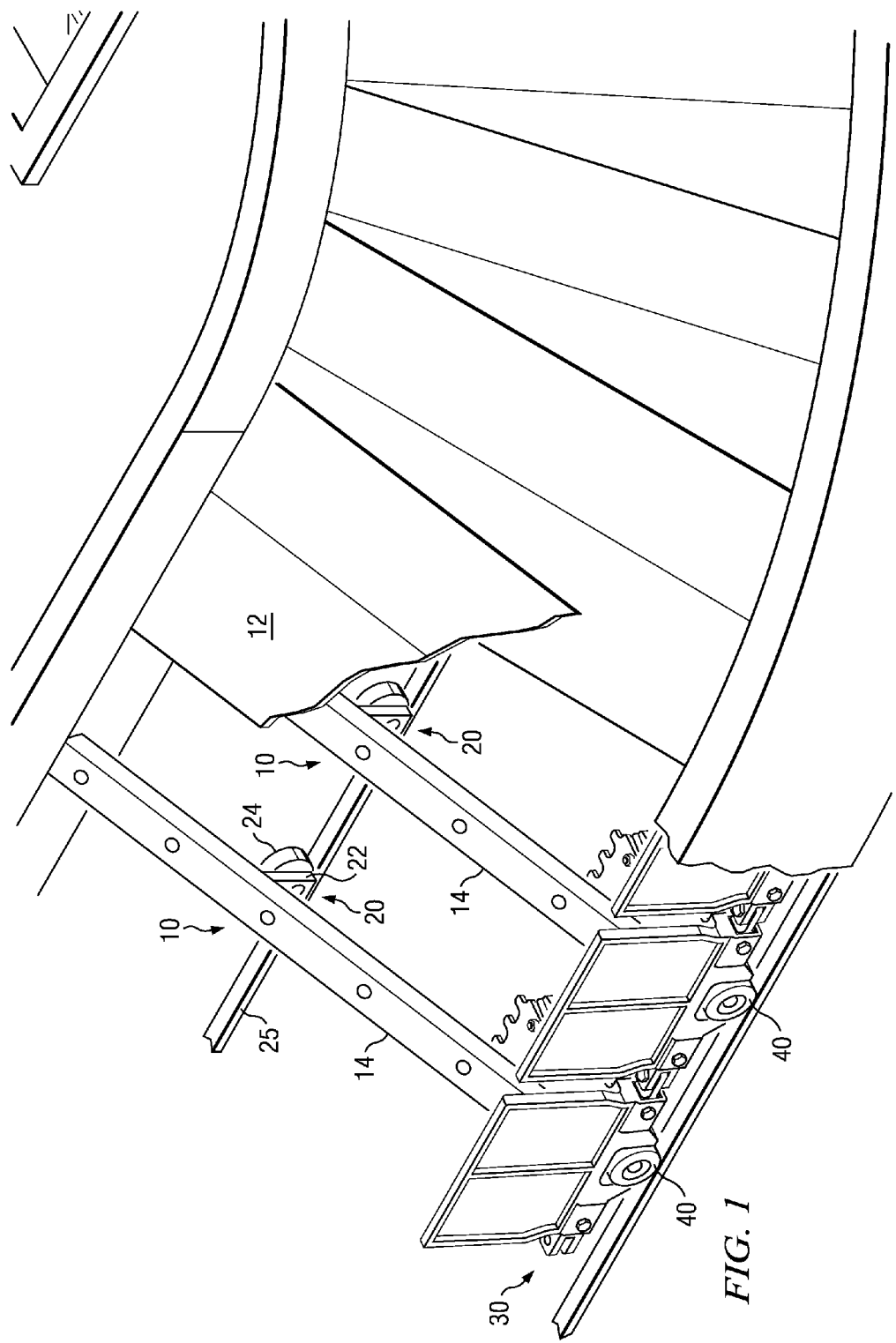
FIG. 1 is an environmental view of a portion of a slope plate luggage carrousel using carriage frame assemblies according to an embodiment of the present disclosure.

FIG. 1 shows an environmental view of two carriage frame assemblies 10 according to an embodiment of the present disclosure. The carriage frame assemblies 10 connect with each other to form a portion of a chain of many such assemblies that form a perimeter of a slope plate luggage carrousel. Each carriage frame assembly 10 supports a slope plate 12. This slope plate 12 may be formed from any suitable material, including stainless steel and any suitable non-metallic material. In certain embodiments, each one of approximately 200 carriage frame assemblies 10 may support a slope plate 12. The slope plate luggage carrousel may receive luggage from a conveyor belt, and the slope of the slope plates 12 may allow the luggage to slide down the slope plates 12, and be stopped and held on the baggage claim system by a lower carriage assembly 30. There, the luggage is conveyed by the carrousel until it is retrieved by its owner.

Each one of the slope plates 12 may be supported by a slope plate support 14. The slope plate support 14 may be a generally elongated bar that extends at an angle from the lower carriage assembly 30 towards a top portion of the slope plate luggage claim system. In certain embodiments, the slope plate support 14 may have a generally C-shaped cross section, and it may define a generally C-shaped channel on its underside.

An upper guide wheel assembly 20 may be coupled to the slope plate support 14. The upper guide wheel assembly 20 may include a bracket 22 and an upper guide wheel 24. The upper guide wheel 24 may generally roll along an upper guide rail 25 of the slope plate luggage claim system. The upper guide rail 25 may support the load for the upper portions of the slope plate supports 14 and the slope plates 12. The upper guide wheel 24, together with a lower guide wheel 40, may define the slope angle of the slope plate 12. The bracket 22 of the upper guide wheel assembly 20 may be secured to the underside of the slope plate support 14 using any suitable fasteners, including bolts, screws, rivets, pins and the like. The upper guide wheel 24 may fit on an upper axle of the upper guide wheel assembly 20 as is known in the art. The upper guide wheel 24 may be fully integrated with a sealed ball bearing and may have an outer roller molded surface. The outer surface may be roller molded in any suitable material. For example, it may be molded in an abrasion and wear resistant (non-hydroscopic) material that is known in the art.

Figure 2:
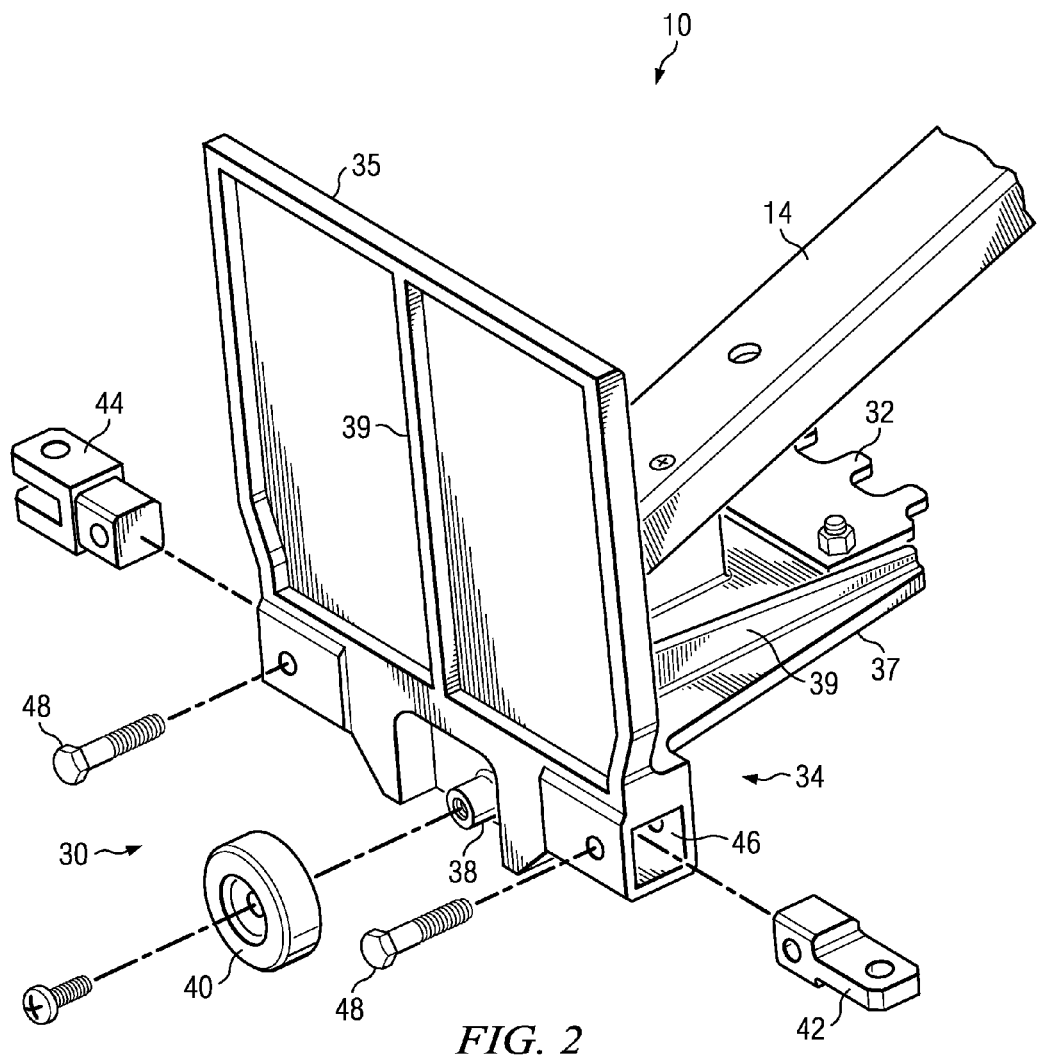
FIG. 2 is an isometric view of a lower portion of one of the carriage frame assemblies of FIG. 1 with certain components shown exploded.

Reference is now made to FIG. 2. FIG. 2 illustrates a magnified view of a lower portion of one of the carriage frame assemblies 10 shown in FIG. 1. As previously stated, the lower portion of the carriage frame assembly 10 includes the lower carriage assembly 30. The lower carriage assembly 30 includes a lower carriage 34. The lower carriage 34 may be a one-piece part that has a generally vertical wall 35 and a generally horizontal wall 37. The lower carriage 34 may be fastened and secured to the slope plate support 14 using any suitable fastener. In certain embodiments, a removable fastener, such as a screw, bolt, rivet, pin, and the like may allow the lower carriage assembly 30 to be removed from the rest of the carriage frame assembly 10 for repair or replacement.

The lower carriage assembly 30 and the lower carriage 34 serve at least four functions. First, the lower carriage 34 provides a mounting surface for a drive chain sprocket segment 32. Next, the lower carriage 34, particularly the generally vertical wall 35, is configured to stop the luggage after it slides down the slope plate 12. The lower carriage 34 also provides a mounting element for a lower guide wheel 40, and the lower carriage assembly 30 provides the linking elements so that lower carriage assemblies 30 may be linked with each other to form the overall length of the slope plate luggage carrousel claim system. A slope plate luggage carrousel according to embodiments of the present disclosure may include any suitable number of carriage frame assemblies depending on the size of the particular luggage claim carrousel.

Each lower carriage assembly 30 may include two removable and replaceable connecting links. For example, the lower carriage assembly 30 may receive a male connecting link 42 and a female connecting link 44. A receiving hole 46 in the lower carriage 34 may be sized to receive and fit either a male connecting link 42 or a female connecting link 44. A corresponding portion of the connecting links 42, 44 opposite the male/female portion may fit into the receiving hole 46. Once fit into the receiving hole 46, the connecting link 42, 44 may be secured to the lower carriage 34 with any suitable fastener 48, such that the connecting link 42, 44 is removable and replaceable upon removal of the fastener 48. For example, a bolt, pin, screw, rivet, and the like type fastener may be inserted through the fastener holes in the lower carriage 34 and through corresponding holes in the respective connecting links 44 and 46. In this manner, the male and female connecting links 42, 44 may be removably secured to the lower carriage 34. As a result, removing the fasteners 48 will allow the connecting links 42, 44 to be removed from the lower carriage 34, and if worn, the connecting links 42, 44 may be replaced with new connecting links. Moreover, the connecting links 42, 44 may be conveniently replaced without removing the entire carriage frame assembly 10 from the slope plate luggage claim system.

The male connecting link 42 may generally define a male connector portion having a through hole. The male connecting portion of the male connecting link 42 may fit into a corresponding female portion of a female connecting link 44. Once inserted, a bolt, pin, screw, rivet, and the like type fastener may be inserted through the holes in the female connecting link 44 and the male connecting link 42 securing one lower carriage assembly 30 to an adjacent lower carriage assembly 30. Each respective lower carriage 34 supports a drive chain sprocket segment 32. In this manner, the drive chain may be constructed through the connection of the lower carriage assemblies 30. Each drive chain sprocket segment 32 may have a linear tooth profile that engages the drive chain of the luggage carrousel system. It may be secured to the lower carriage 34 with any suitable fastener. By securing the sprocket segment 32 with a fastener, it may be removed and replaced if worn or otherwise nonoperational. The drive chain sprocket segment 32 may be made of any suitable material. For example, it may be made of metal or a non-metallic composite material. The chain of lower carriage assemblies 30 forms the overall carriage frame assembly 10 that supports slope plates 12.

The lower carriage 34 may have a metal axle 38 molded into it. The metal axle 38 may be sized to receive the bearing of the lower guide wheel 40. The bearing may be in slip fit connection with the axle 38. The lower guide wheel 40 may be similar to the upper guide wheel in that it includes a fully integrated and sealed ball bearing. The outer surface may be a roller molded out of abrasion and wear resistant material. The lower guide wheel 40 may be removed if worn and replaced with a new guide wheel.

Figure 3:
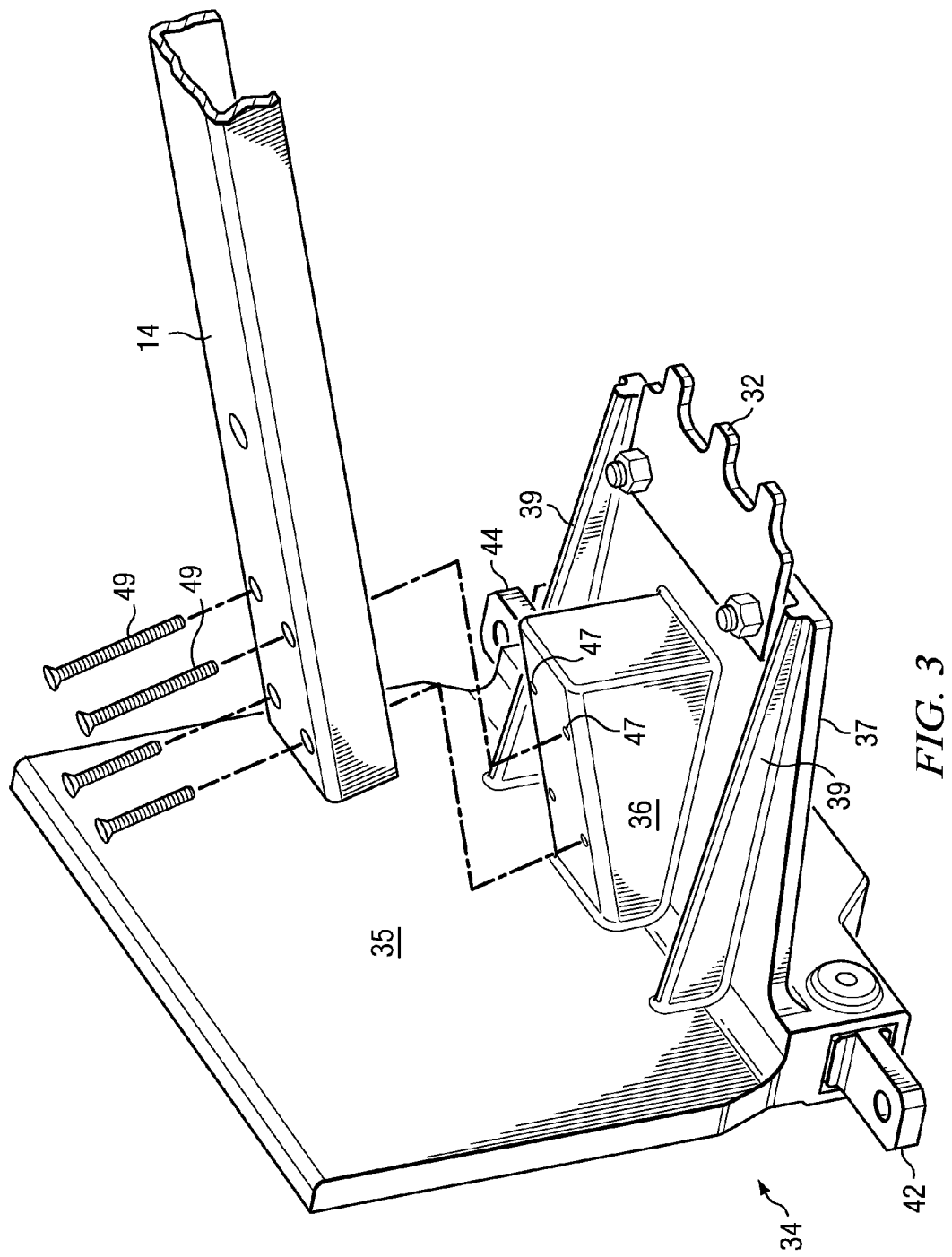
FIG. 3 is another isometric view of the carriage frame assembly of FIG. 2 with a component shown exploded.

Reference is now made to FIG. 3, which illustrates the lower carriage assembly 30 and shows the slope plate support 14 exploded from the lower carriage assembly 30. As illustrated, the lower carriage 34 of the lower carriage assembly 30 may generally be a molded part made of a non-metallic composite material. As previously stated, the lower carriage 34 may be a single integral part having a generally vertical wall 35 and a generally horizontal wall 37, as opposed to the two separate pieces of steel that are welded together to form a conventional lower carriage. As such, it generally may be a thin walled part with stiffening ribs 39 at appropriate locations to make the part stronger. For example, there may be a stiffening rib 39 extending vertically over the length of the generally vertical wall 35 (see FIG. 2).

In addition, a wedge-shaped mounting portion 36 of the lower carriage 34 may be formed on the generally horizontal wall 36. The wedge-shaped mounting portion 36 may be a feature that is molded into and integral with the lower carriage 34. The wedge-shaped mounting portion 36 may have a top surface that generally slopes downward toward the generally vertical wall 35 of the lower carriage 34. This slope may generally define the slope of the slope plate support 14 and the corresponding slope plate 12. The wedge-shaped mounting portion 36 may also have threaded or non-threaded holes 47 to receive fasteners 49 that secure the slope plate support 14 to the wedge shaped mounting portion 36 and allow the two parts to be separated if repair or replacement of either part/assembly is needed. Any suitable removable fastener 49 may be used according to the teachings of the present disclosure to fasten the slope plate support 14 to the wedge shaped mounting portion 36.

According to the teachings of the present disclosure, a carriage frame assembly 10 may have removable connecting links 42 and 44. In addition, the carriage frame assembly 10 may replace a conventional carriage frame that is a one piece welded construction. As such, the carriage frame assembly 10, according to embodiments of the present disclosure, may have the proper geometry to generally fit and retrofit into existing slope plate luggage carrousel claim systems and be joined with conventional metal welded construction carriage frames. That is, the removable male and female connecting links 42, 44 of the carriage frame assembly 10 may fit into corresponding male and female connecting links of conventional carriage frames.

The components of the carriage frame assembly 10 may be composed of non-metallic materials. In particular, the slope plate support 14 and the lower carriage assembly 30, including the male and female connecting links 42 and 44 may be formed from non-metallic materials. For example, these components may be made of any suitable composite material including fiberglass, carbon fiber, epoxy, castable urethanes, and injection molded polymers, such as plastics. In certain embodiments, the components of the carriage frame assembly 10, particularly, the connecting links 42, 44 may be molded from a glass filled polymer, such as glass filled nylon. An example of a specific material that is suitable for the components of the carriage frame assembly 10 is Ixef® polyarylamide 1622, which is available from Solvay® Advanced Polymers. By constructing the components out of these materials, significant weight savings in the overall system may be realized. Also, using removable fasteners, as opposed to welds, to join components of the carriage frame assembly 10 may make replacement and repair of worn components significantly cheaper and easier than replacement of the entire conventional welded one-piece carriage frames.

Embodiments of the invention have been described and illustrated above. The invention is not limited to the disclosed embodiments.

What is claimed is:

1. A slope plate carrousel carriage frame, comprising:
a slope plate support member configured to support a slope plate of a slope plate luggage carrousel;
a lower carriage coupled to the slope plate support member; and
at least one removable connecting link secured to the lower carriage by a fastener and being configured to couple to an adjacent slope plate carrousel carriage frame; and
wherein the lower carriage defines a hole that receives a portion of the at least one removable connecting link.

2. The carriage frame of claim 1, further comprising a drive sprocket segment coupled to the lower carriage.

3. The carriage frame of claim 2, further comprising:
an upper guide wheel coupled to the slope plate support member; and
a lower guide wheel coupled to the lower carriage.

4. The carriage frame of claim 1, wherein the at least one removable connecting link comprises a male removable connecting link and a female removable connecting link, the male removable connecting link configured to fit into an adjacent female connecting link.

5. The carriage frame of claim 1, wherein the lower carriage comprises a wedge-shaped mounting portion, the slope plate support member being secured to the wedge-shaped mounting portion using a fastener.

6. The carriage frame of claim 5, wherein the lower carriage includes a generally vertical wall and a generally horizontal wall, the wedge-shaped mounting portion extending from the generally horizontal wall, and the generally vertical wall including a generally vertical stiffening rib.

7. The carriage frame of claim 1, further comprising an axle molded into the lower carriage, the axle supporting a lower guide wheel.

8. The carriage frame of claim 1, wherein the lower carriage and the at least one removable connecting link are each formed from a non-metallic material.

9. An apparatus, comprising:
a slope plate support member configured to support a slope plate of a slope plate luggage carrousel;
a lower carriage coupled to the slope plate support member;
wherein the slope plate support member and the lower carriage are each formed from a non-metallic material;
at least one removable connecting link secured to the lower carriage by a fastener and being configured to couple to an adjacent lower carriage of an adjacent slope plate carrousel carriage frame; and
wherein the lower carriage defines a hole that receives a portion of the at least one removable connecting link.

10. The apparatus of claim 9, wherein the at least one removable connecting link is formed from a non-metallic material.

11. The apparatus of claim 10, wherein the non-metallic materials are selected from the group consisting of fiberglass, carbon fiber, epoxy, castable urethane and Ixef® polyarylamide.

12. The apparatus of claim 9, wherein the at least one removable connecting link comprises a male removable connecting link and a female removable connecting link.

13. The apparatus of claim 9, wherein the lower carriage comprises a wedge-shaped mounting portion, the slope plate support member being removably secured to the wedge-shaped mounting portion.

14. A slope plate carrousel carriage frame, comprising:
a slope plate support member configured to support a slope plate of a slope plate luggage carrousel;
a lower carriage coupled to the slope plate support member and including a first opening and a second opening;
a male removable connecting link received by the first opening and secured to the lower carriage by a first fastener;
a female removable connecting link received by the second opening and secured to the lower carriage by a second fastener,
wherein the male and female removable connecting links are each configured to couple to a respective adjacent slope plate carrousel carriage frame.

15. The carriage frame of claim 14, further comprising:
an upper guide wheel coupled to the slope plate support member; and
a lower guide wheel coupled to the lower carriage.

16. The carriage frame of claim 15, wherein:
the lower carriage includes a generally vertical wall and a generally horizontal wall, and a wedge-shaped mounting portion extends from the generally horizontal wall, and the generally vertical wall includes a generally vertical stiffening rib.

17. The carriage frame of claim 14, wherein the lower carriage is formed from a non-metallic material.

18. The carriage frame of claim 14, wherein the male removable connecting link and the female removable connecting link are each formed from a non-metallic material.

* * * * *